United States Patent [19]

Shiozawa

[11] Patent Number: 5,212,949
[45] Date of Patent: May 25, 1993

[54] EXHAUST GAS CLEANING SYSTEM FOR A MARINE PROPULSION UNIT

[75] Inventor: Shigeki Shiozawa, Hamamatsu, Japan

[73] Assignee: Sanshin Kogyo Kabushiki Kaisha, Shizuoka, Japan

[21] Appl. No.: 703,808

[22] Filed: May 21, 1991

[30] Foreign Application Priority Data

May 22, 1990 [JP] Japan .................................. 2-130257

[51] Int. Cl.$^5$ ............................................... F01N 3/28
[52] U.S. Cl. ........................................ 60/298; 60/295; 60/302; 60/310; 60/321; 440/89
[58] Field of Search ............... 60/298, 302, 321, 295, 60/310; 440/89

[56] References Cited

U.S. PATENT DOCUMENTS

| | | | |
|---|---|---|---|
| 4,023,361 | 5/1977 | Kojima | 60/302 |
| 4,573,318 | 3/1986 | Entringer | 60/310 |
| 4,735,046 | 4/1988 | Iwai | 60/302 |
| 4,831,822 | 5/1989 | Yoshimura | 60/310 |
| 4,887,427 | 12/1989 | Shinzawa | 60/302 |
| 4,927,390 | 5/1990 | Kudoh | 440/89 |

FOREIGN PATENT DOCUMENTS

| | | | |
|---|---|---|---|
| 2345383 | 3/1975 | Fed. Rep. of Germany | 60/298 |
| 24616 | 2/1977 | Japan | 60/302 |
| 55-10043 | 1/1980 | Japan . | |
| 55-12233 | 1/1980 | Japan . | |
| 57-203814 | 12/1982 | Japan . | |

OTHER PUBLICATIONS 2,501,942–Jun. 1990–Japan.

Primary Examiner—Douglas Hart
Attorney, Agent, or Firm—Ernest A. Beutler

[57] ABSTRACT

An exhaust gas cleaning system is provided for use with a watercraft engine. A plurality of horizontally positioned exhaust ports are located within an engine cylinder head. An exhaust manifold communicates with each of the exhaust ports at a first end and forms a gas collecting pipe at its second end. The second end of the gas collecting pipe is positioned above the exhaust ports. A generally horizontally positioned exhaust pipe extends from the second end of the gas collecting pipe and continues in a rearward direction. Means are provided for introducing coolant from the engine into the rearwardly extending portion of the exhaust pipe. A removable catalyst member is located within and across the exhaust pipe between the exhaust manifold and the area where coolant is introduced into the exhaust pipe. The catalyst is provided with a plurality of small holes therein, so that exhaust gases may be effectively cleaned. The invention is particularly adapted for use in a four-cycle inboard-outboard marine propulsion system.

13 Claims, 5 Drawing Sheets

EXHAUST GAS CLEANING SYSTEM FOR A MARINE PROPULSION UNIT

BACKGROUND OF THE INVENTION

This invention relates to an exhaust gas purifying device for a marine engine and more particularly to an improved and highly effective system for treating the exhaust gases of an engine prior to their discharge to the atmosphere.

It has been known in an exhaust gas cleaning system for a two-cycle engine to utilize a plate-like catalyst arrangement disposed along the inner surface of a section of exhaust piping located between the exhaust port of the engine and a gas-water mixing area, whereat cooling water from a water jacket is mixed in with exhaust gases. Such a system gasifies lubricant oil remaining in the exhaust gases by the catalyst through oxidation or reduction reactions.

With the above-discussed cleaning system, most of the harmful constituents of the exhaust gases pass through the central portion of the exhaust piping cross-section, without contacting the plate-like catalyst. Therefore, a second catalyst is required to be disposed at an outlet end of the exhaust piping arrangement to catch such harmful constituents. However, since such a second catalyst is often disposed downstream of the gas-water mixing area, discussed above, it is located in a relatively low temperature region, which renders the catalyst less active, and accordingly, sufficient cleaning of the exhaust gases cannot be achieved.

Additionally, such systems employing multiple catalysts can be extremely cumbersome. First, such systems are often quite substantial in their spatial layout, thereby precluding the most efficient use of available space within a watercraft. Secondly, it can often be difficult accessing and replacing the catalyst members upon expiration of their useful life.

Also, exhaust gas systems which mix engine coolant with the exhaust gases along a region of an exhaust pipe system can also pose the problem of backflow of coolant toward both the catalyst, or catalysts, and also toward the exhaust ports associated with the cylinders of an engine. Such backflow is undesirable since it can render a catalyst ineffective for cleaning purposes, and it may further cause reduced engine performance.

It is therefore a principal object of this invention to provide an improved catalyst arrangement within the exhaust system of an engine for highly effective cleaning of the exhaust gases.

It is a further object of this invention to provide a catalytic exhaust gas cleaning arrangement which is readily removable from the exhaust system of an engine for easy replacement at the end of the catalyst's useful life.

It is still a further object of this invention to provide an exhaust gas arrangement which is compact in its design and is further able to prevent undesirable water coolant backflow through the exhaust system.

It is yet a further object of this invention to provide such a catalytic exhaust gas cleaning arrangement for use in a watercraft inboard-outboard motor; particularly, a four-cycle marine propulsion unit engine.

SUMMARY OF THE INVENTION

A first feature of this invention is adapted to be embodied in an exhaust gas cleaning system provided for use with a watercraft engine. The engine is provided with a water cooled engine block and a cylinder head. A plurality of horizontally positioned exhaust ports are located within the cylinder head. An exhaust manifold communicates with each of the exhaust ports at a first end and forms a gas collecting pipe at its second end. The second end of the gas collecting pipe is positioned above the exhaust ports. A generally horizontally positioned exhaust pipe extends from the second end of the gas collecting pipe and continues in a rearward direction. Means are provided for introducing coolant from the engine into the rearwardly extending portion of the exhaust pipe. A catalyst member is located within and across the exhaust pipe between the exhaust manifold and the area where coolant is introduced into the exhaust pipe.

Another feature of this invention is similarly adapted to be embodied in an exhaust gas cleaning system provided for use with a watercraft engine. A catalyst holding bracket is provided with at least one hole therein for holding a catalyst within the bracket. The catalyst holding bracket is removably positioned between an engine block and an exhaust manifold of the watercraft engine. Accordingly, the temperature of the catalyst can be maintained at a high level during operation of the engine.

DETAILED DESCRIPTION OF THE PREFERRED EMBODIMENTS

Figure 1:
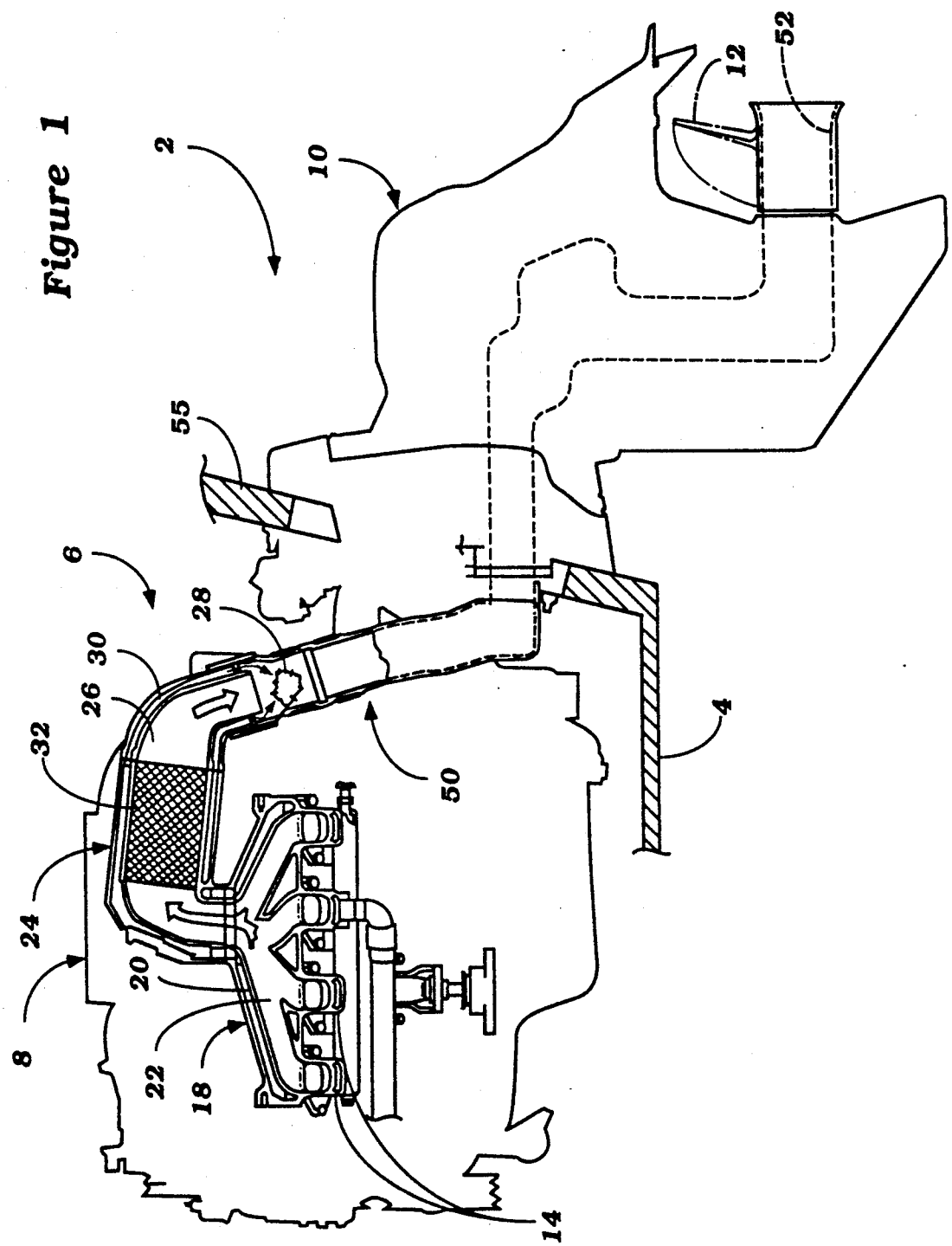
FIG. 1 is a side elevational view of an inboard-outboard motor constructed in accordance with a first embodiment of the invention, with portions broken away and other portions shown in section.

Referring now in detail to the drawings and initially to FIG. 1, a watercraft constructed in accordance with an embodiment of the invention is shown partially and is identified generally by the reference numeral 2. The watercraft is comprised of a hull 4 having a rearwardly positioned compartment in which an inboard-outboard motor 6 is positioned. The inboard-outboard motor 6 is principally comprised of an engine 8 and an outboard drive unit 10. The engine 8 is of the water-cooled internal combustion type. As depicted, the engine 8 is of the four cylinder type operating on the four stroke principal. The engine is provided with an output shaft which is coupled to a transmission mechanism (not shown) for driving a propeller 12, in a known manner.

The engine 8 is shown only partially since the significant features of the invention deal with its exhaust system. Where not described, the components of the engine may be considered to be conventional.

Figure 2:
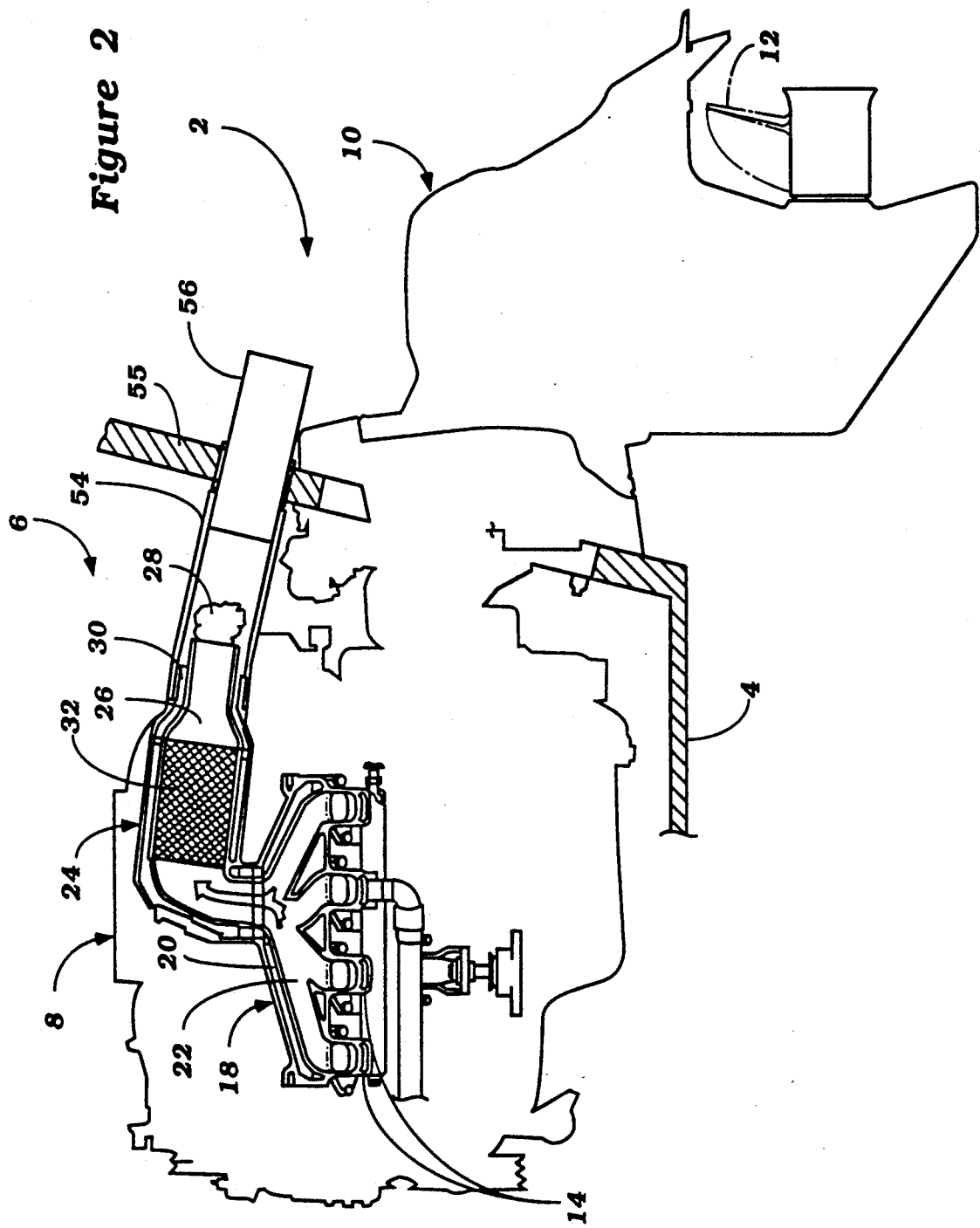
FIG. 2 is a side elevational view of an inboard-outboard motor constructed in accordance with a second embodiment of the invention, with portions broken away and other portions shown in section.

Referring additionally to FIG. 2, the engine 8 has a plurality of horizontally positioned exhaust ports 14, each associated with a cylinder (not shown), which open into an exhaust manifold 18. The exhaust manifold 18 is cooled by cooling water which runs through a water jacket 20 of the engine 8, in a known manner. In the embodiments shown, the exhaust gases flow from the manifold 18 through a first exhaust passageway 22 which forms a gas collecting pipe at its upper end. The exhaust gases then flow upwardly through the gas collecting pipe region of the exhaust passageway 22 to an exhaust pipe 24 positioned generally horizontally above the exhaust ports. Next the exhaust gases flow through a second exhaust passageway 26 and subsequently to a gas-water mixing area 28, whereat the exhaust gases are mixed with the cooling water expelled from a water jacket 30 which surrounds the exhaust passageways 22 and 26.

Figure 5:
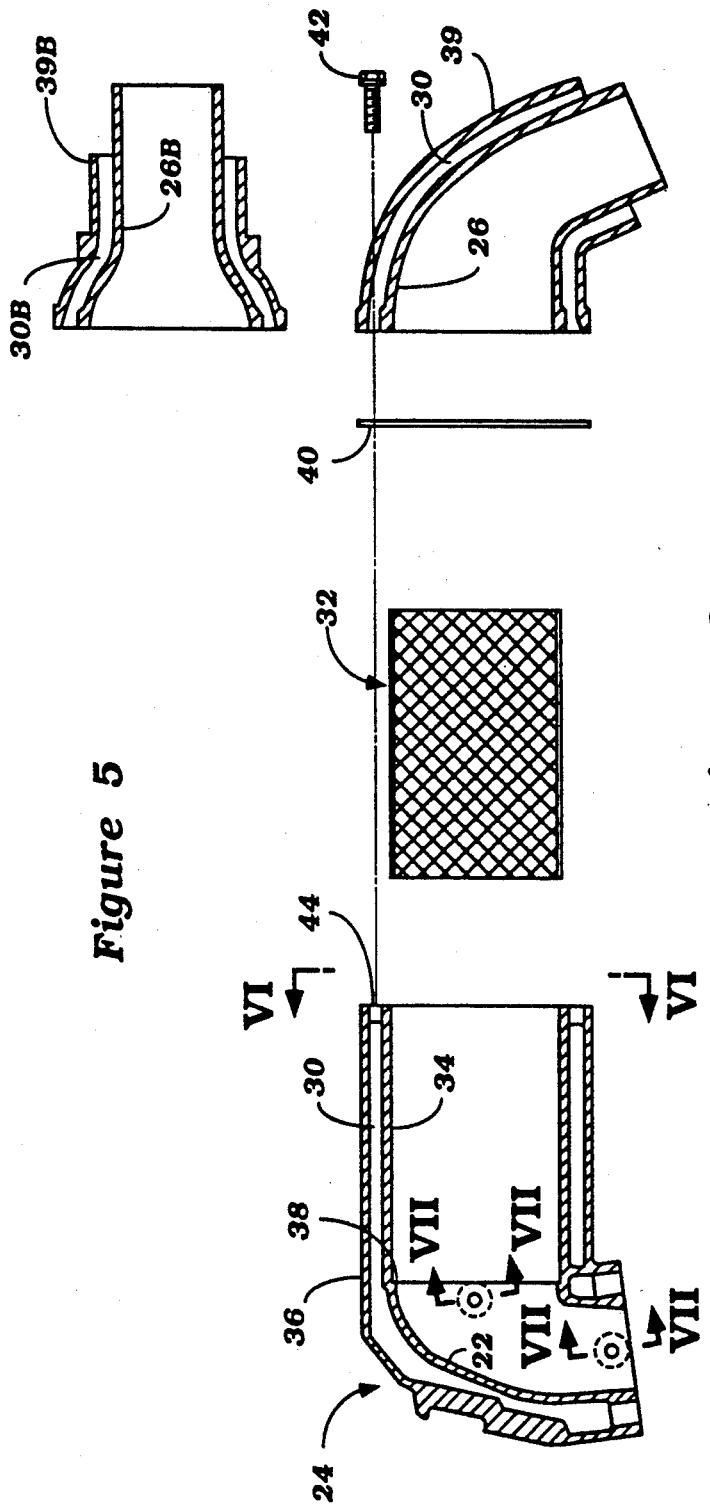
FIG. 5 is a detailed cross-sectional view of the catalytic exhaust arrangement as shown in FIGS. 1 and 2.
Figure 7:
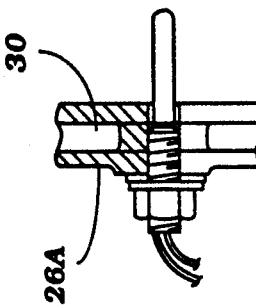
FIG. 7 is a cross-sectional view taken along the line VII—VII of FIG. 5.
Figure 6:
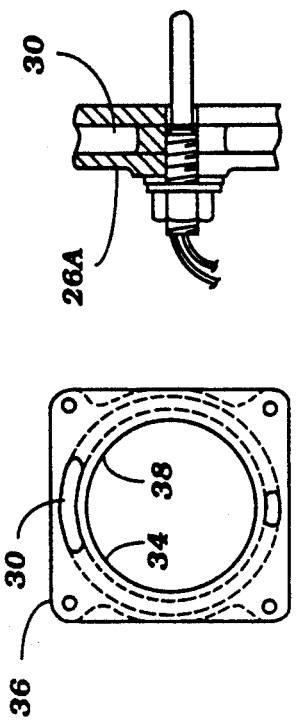
FIG. 6 is a cross-sectional view taken along the line VI—VI of FIG. 5.

In the embodiments of the invention depicted in FIGS. 1 and 2 the catalyst member 32 is positioned within the exhaust pipe 24. Furthermore, the rearwardmost portion of the catalyst member 32 extends no further rearwardly than any of the exhaust ports 14. FIG. 5 shows the arrangement in greater detail. The catalyst member 32 is constructed in the form of a cartridge which is receivable within the exhaust pipe 24 along its inner wall 34. Within the upstream half 36 of the exhaust pipe 24 one end of the catalyst member engages a shoulder region 38 formed along the intersection of the first exhaust passage 22 and the inner wall 34 of the exhaust pipe 24. FIG. 6 depicts this region of the exhaust pipe 24 in cross-section along the line VI—VI of FIG. 5.

A bushing member 40 engages the other side of the catalyst member 32 and is interposed between the catalyst member 32 and the downstream half 39 of the exhaust pipe 24. A threaded fastener 42 extends from a position along the top of the downstream half 39 of the exhaust pipe 24 and through the bushing member 40 and is ultimately received at a position 44 along the top of the exhaust pipe 24.

It should be noted that the arrangement of FIGS. 1 and 2, with the catalyst 32 disposed above the horizontally positioned exhaust ports 14, is quite compact and allows the engine 8 to be placed in very close proximity to the transom 55 of the watercraft's hull 4.

The embodiments of FIGS. 1 and 2 differ regarding the pathway which the exhaust gases follow after passing through the gas-water mixing portion 28. In the embodiment of FIG. 1 the exhaust gas proceed downwardly through an exhaust pathway 50 which extends through a portion of the transom 55 of the hull 4 and ultimately terminates in a through the hub exhaust gas outlet 52 of the propeller 12. In the embodiment of FIG. 2 the exhaust gases proceed through an exhaust pathway 54 which extends rearwardly through a portion of the transom 55 of the hull 4 at a location slightly above the outboard drive unit 10. FIG. 5 illustrates the different downstream half portions 39 and 39B of the embodiments of FIGS. 1 and 2, respectively.

It can be appreciated that placement of the catalyst member 32 within and across the exhaust pipe 24 allows the catalyst itself to act as an impediment to any cooling water which may flow back through the exhaust system towards the exhaust manifold 18. Furthermore, as can be seen from the FIGS., since the catalyst member 60 is provided with a substantial length dimension within the exhaust pipe 24, even if cooling water impinges upon a downstream end of the catalyst and renders this portion partially or wholly ineffective, the remainder of the catalyst length upstream may remain effective to adequately clean the exhaust gases.

Another advantage of the placement of the catalyst member 32 in the embodiments of FIGS. 1 and 2 is that the catalyst 32 is reasonably close to the exhaust manifold 18, which maintains a relatively high temperature during operation of the engine 8, thus imparting heat to the catalyst 32 and thus enhancing its effectiveness.

Figure 3:
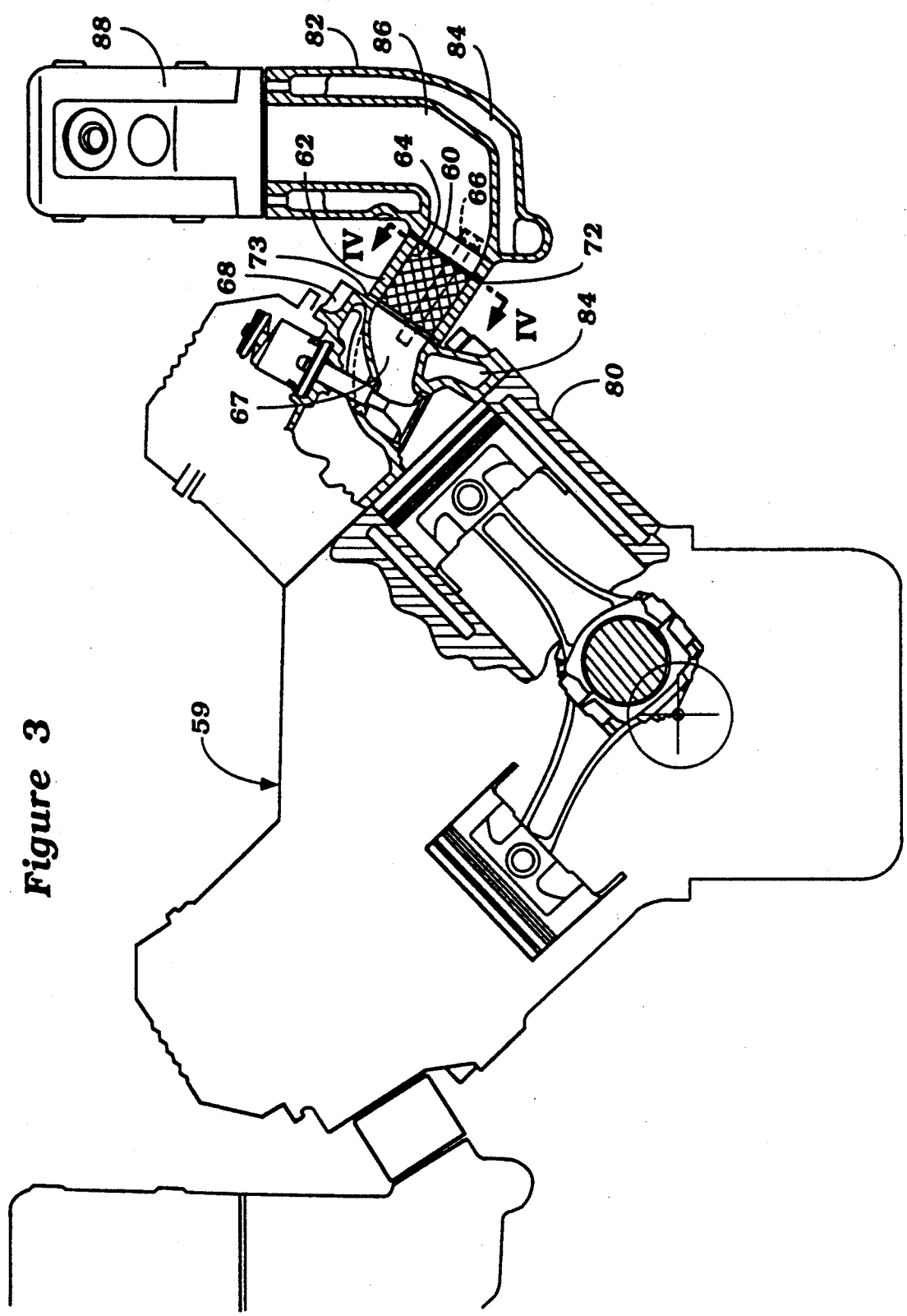
FIG. 3 is a front view, with portions shown in section, of an inboard-outboard motor constructed in accordance with a third embodiment of the invention.
Figure 4:
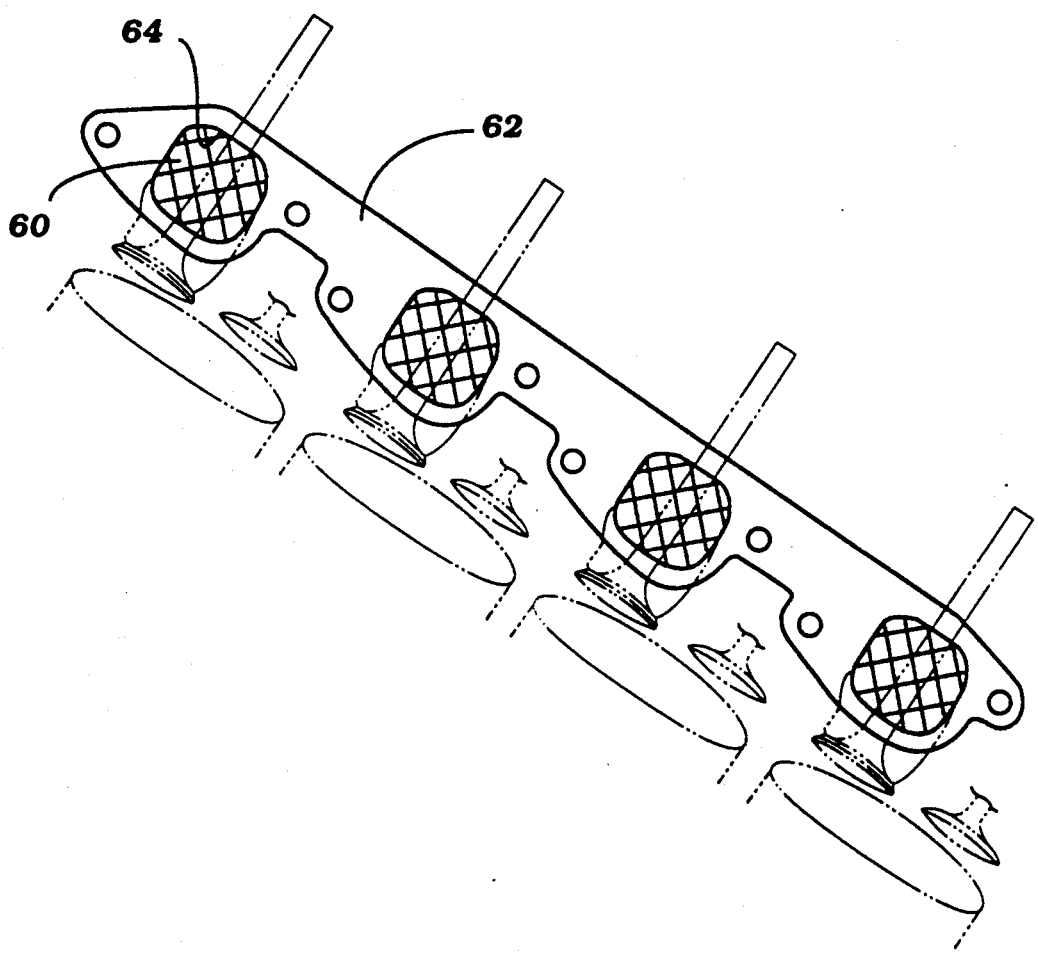
FIG. 4 is a cross-sectional view taken along the line IV—IV of FIG. 3.

In the embodiment of FIGS. 3 and 4 an engine 59 is shown in which a catalyst member 60 is held by a catalyst holding member 62 within a catalyst holding hole 64. The catalyst member 60 and its associated holding member 62 form a portion of an exhaust gas pathway in this embodiment. A threaded fastener 66, shown in phantom in FIG. 3, is employed to secure the catalyst holding member 62 in place. The holding member 62 and securing threaded fastener 66 allow easy removal of the entire catalyst member 60 for replacement upon expiration of the catalyst's useful life.

The catalyst member 60 may be positioned between an engine block 80 and an exhaust manifold 82. Specifically, as shown in the Figures, the catalyst member 60 is located between the horizontally positioned exhaust ports 67 within a cylinder head 68 and an exhaust manifold 82. As known, this is a high temperature operating region of the engine; thus, placement of the catalyst member 60 at this position helps to insure that low temperatures do not interfere with effective operation of the catalyst 60. Bushing member 72 and 73 may be positioned at each end of the catalyst member 60.

A water jacket 84 surrounds much of the exhaust gas pathway of FIG. 3. An exhaust passage 86, located just beyond the catalyst member 60, leads on to an exhaust elbow 88 which, in turn, leads to further exhaust system components similar to those of FIGS. 1 and 2.

Further, as with the embodiments of FIGS. 1 and 2, the flowpath for the exhaust gases, in the embodiment of FIGS. 3 and 4, from the horizontally positioned exhaust ports 67 may extend upwardly to a position above the exhaust ports 67, and the exhaust passage 86 may be positioned generally horizontally and extend rearwardly with respect to the watercraft.

In all of the embodiments of the invention, the catalyst member 60 is provided with a plurality of small holes therein, in order to provide a sufficient surface area upon which the exhaust gases may be effectively cleaned.

It should be readily apparent from the foregoing description that a number of embodiments of the invention have been illustrated and described each of which depicts an excellent catalyst arrangement within the exhaust system of an engine for highly effective cleaning of the exhaust gases. Although a number of embodiments of the invention have been illustrated and described, it should be readily apparent to those skilled in the art that various changes and modifications may be made without departing from the spirit and scope of the invention, as defined by the appended claims.

We claim:

1. An exhaust gas cleaning system for use with a watercraft engine comprising a water cooled engine block and a cylinder head; and a plurality of exhaust ports located within said cylinder head, and positioned horizontally; and, an exhaust manifold in communication with each of said exhaust ports at a first end and forming a gas collecting pipe at a second end, said collecting pipe positioned above said exhaust ports; said exhaust manifold provided with a mating face which mates with said engine; said exhaust manifold further including a generally horizontally positioned exhaust pipe extending from said collecting pipe and continuing rearwardly therefrom; and means for introducing coolant from said engine into said rearwardly extending portion of said exhaust pipe; and, a catalyst member located within and across said horizontally positioned region of said exhaust pipe; said catalyst mounted within a catalyst holding structure formed within said exhaust pipe between said collecting pipe portion of said exhaust manifold and the area where coolant is introduced into said rearwardly extending portion of said exhaust pipe; and wherein said exhaust manifold is formed with an integral coolant jacket; and further comprising a coolant inlet provided substantially upstream of said catalyst holding structure for allowing coolant to enter said coolant jacket; wherein said coolant jacket is continuous and void of joints between said coolant inlet and a rearwardmost end of said catalyst; and wherein said catalyst is in a heat exchange relationship with said coolant jacket.

2. The exhaust gas cleaning system of claim 1 wherein said catalyst member and said exhaust pipe containing said catalyst holding structure extend generally horizontally in the same direction and wherein some axial overlap is provided between said catalyst and said exhaust ports.

3. The exhaust gas cleaning system of claim 2 wherein said catalyst is a perforate member extending completely across said exhaust pipe, so that exhaust gases may be effectively cleaned.

4. The exhaust gas cleaning system of claim 3 wherein said exhaust pipe comprises two separate connectable pieces and said catalyst is removably insertable into one of said two pieces.

5. The exhaust gas cleaning system of claim 4 wherein said engine operates on a four-stroke cycle.

6. The exhaust gas cleaning system of claim 5 wherein said four-cycle engine is part of an inboard-outboard propulsion unit for a marine watercraft.

7. The exhaust gas cleaning system of claim 6 wherein said engine is located in very close proximity to a transom of a hull of said marine watercraft since said catalyst is positioned above said exhaust ports and, thus, does not impede locating said engine in such a manner.

8. The exhaust gas cleaning system of claim 7 wherein said rearwardly extending portion of said exhaust pipe further extends downwardly through an opening in said transom and through an outboard drive unit of said marine watercraft and continues on through a central portion of a propeller of said outboard drive unit, at which point an exhaust outlet is located, so that exhaust gases are discharged through said propeller into a body of water in which said marine watercraft operates.

9. The exhaust gas cleaning system of claim 7 wherein said rearwardly extending portion of said exhaust pipe further extends through an opening in said transom above an outboard drive unit of said marine watercraft, at which point an exhaust outlet is located.

10. The exhaust gas cleaning system of claim 1 wherein said coolant inlet is located at said mating face of said exhaust manifold, whereat said exhaust manifold mates with said engine.

11. The exhaust gas cleaning system of claim 1 wherein said generally horizontally positioned exhaust pipe narrows in diameter along its rearwardmost end.

12. An exhaust gas cleaning system for use with a watercraft engine comprising a water cooled engine block and a cylinder head; and a plurality of exhaust ports located within said cylinder head, and positioned horizontally; and, an exhaust manifold in communication with each of said exhaust ports at a first end and forming a gas collecting pipe at a second end, said collecting pipe positioned above said exhaust ports; said exhaust manifold further including a generally horizontally positioned exhaust pipe extending from said collecting pipe and continuing rearwardly therefrom; and a water coolant jacket surrounding said generally horizontally positioned exhaust pipe; a catalyst member located within and across said horizontally positioned region of said exhaust pipe, wherein said catalyst is in a heat exchange relationship with said coolant jacket; and further comprising a downwardly turned pipe portion extending rearwardly off of said horizontally positioned exhaust pipe; wherein coolant from said water coolant jacket is mixed with exhaust gases within said downwardly turned pipe portion.

13. The exhaust gas cleaning system of claim 23 wherein said generally horizontally positioned exhaust pipe narrows in diameter along its rearwardmost end.

* * * * *

UNITED STATES PATENT AND TRADEMARK OFFICE
CERTIFICATE OF CORRECTION

PATENT NO. : 5,212,949

DATED : May 25, 1993

INVENTOR(S) : Shigeki Shiozawa

It is certified that error appears in the above-indentified patent and that said Letters Patent is hereby corrected as shown below:

Column 6, line 45, Claim 13, "23" should be --12--.

Signed and Sealed this

Fifth Day of April, 1994

Attest:

BRUCE LEHMAN

Attesting Officer      Commissioner of Patents and Trademarks